United States Patent
Ayyagari V U et al.

(10) Patent No.: US 10,776,320 B2
(45) Date of Patent: Sep. 15, 2020

(54) AVOIDING REDUNDANT PRESENTATION OF CONTENT

(71) Applicant: International Business Machines Corporation, Armonk, NY (US)

(72) Inventors: Phani Kumar Ayyagari V U, Hyderabad (IN); Manish A. Bhide, Hyderabad (IN); Krishnasuri Narayanam, Bangalore (IN); Jasti Purnachandra Rao, Hyderabad (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 793 days.

(21) Appl. No.: 15/215,203

(22) Filed: Jul. 20, 2016

(65) Prior Publication Data

US 2018/0025018 A1    Jan. 25, 2018

(51) Int. Cl.
*G06F 17/00* (2019.01)
*G06F 16/174* (2019.01)
*G06F 16/23* (2019.01)
*G06F 16/9535* (2019.01)
*G06Q 50/00* (2012.01)

(52) U.S. Cl.
CPC ...... *G06F 16/1748* (2019.01); *G06F 16/2365* (2019.01); *G06F 16/9535* (2019.01); *G06Q 50/01* (2013.01)

(58) Field of Classification Search
CPC ......... G06F 17/30156; G06F 17/30371; G06F 17/30722; G06F 17/30867; G06F 16/9535; G06F 16/2365; G06F 16/1748
See application file for complete search history.

(56) References Cited

U.S. PATENT DOCUMENTS

| | | | |
|---|---|---|---|
| 6,934,740 B1 * | 8/2005 | Lawande | G06F 16/80 709/213 |
| 10,275,798 B1 * | 4/2019 | Clark | G06F 16/9558 |
| 10,503,796 B2 * | 12/2019 | Stein | G06F 16/248 |
| 2007/0157222 A1 * | 7/2007 | Cordray | H04H 60/33 725/13 |

(Continued)

FOREIGN PATENT DOCUMENTS

WO    2014106168 A1    7/2014

OTHER PUBLICATIONS

IBM: List of IBM Patents or Patent Applications Treated as Related, 2 pg.

(Continued)

*Primary Examiner* — Hasanul Mobin
(74) *Attorney, Agent, or Firm* — Cuenot, Forsythe & Kim, LLC (57) ABSTRACT

A first application executing on a client device can access content and present the content to a user. An operating system of the client device can store into a database metadata identifying at least the content. A second application executing on the client device can access the content. In response, the operating system can determine that the first application already presented the content by accessing the metadata in the database. Responsive to the operating system determining that the first application already presented the content, the operating system can indicate to the second application not to present the content.

16 Claims, 4 Drawing Sheets

(56) References Cited

U.S. PATENT DOCUMENTS

| | | | |
|---|---|---|---|
| 2008/0222201 A1* | 9/2008 | Chen | G06F 16/58 |
| 2009/0144321 A1* | 6/2009 | Shamma | G06F 17/30997 |
| 2011/0213816 A1* | 9/2011 | Doshi | G06F 17/30194 |
| | | | 707/827 |
| 2011/0282893 A1* | 11/2011 | Dolin | G06Q 10/10 |
| | | | 707/769 |
| 2012/0227076 A1* | 9/2012 | McCoy | H04N 21/8586 |
| | | | 725/110 |
| 2012/0233036 A1* | 9/2012 | Mirashrafi | G06Q 30/00 |
| | | | 705/27.2 |
| 2013/0072264 A1* | 3/2013 | Koo | G06F 3/04842 |
| | | | 455/566 |
| 2013/0325922 A1* | 12/2013 | Chaudhri | G06Q 10/10 |
| | | | 709/203 |
| 2014/0280266 A1* | 9/2014 | Walter | G06F 17/30038 |
| | | | 707/758 |
| 2015/0081449 A1* | 3/2015 | Ge | G06F 3/0482 |
| | | | 705/14.66 |
| 2016/0012048 A1* | 1/2016 | Yellin | G06F 16/435 |
| | | | 707/722 |
| 2016/0055532 A1* | 2/2016 | Connolly | G06Q 30/0261 |
| | | | 705/14.55 |
| 2017/0046741 A1* | 2/2017 | Hunter | G06Q 30/0275 |
| 2017/0185687 A1* | 6/2017 | Pai | G06Q 10/101 |
| 2017/0228787 A1* | 8/2017 | Oyaga | G06Q 30/0264 |

OTHER PUBLICATIONS

Ayyagari V U, P.K. et al., "Avoiding Redundant Presentation of Content," U.S. Appl. No. 15/882,855, filed Jan. 29, 2018, 26 pages (A copy is not provided as this application is available to the Examiner).

* cited by examiner

AVOIDING REDUNDANT PRESENTATION OF CONTENT

BACKGROUND

The present invention relates to processing systems, and more specifically, to managing content accessed by the processing systems.

A social networking service is a platform to build social networks or social relations among people who share similar personal and career interests, activities, backgrounds or real-life connections. Using social networking services, people can share contacts with the friends, family and other contacts. Oftentimes people subscribe to more than one social networking service. For example, a particular user may subscribe to two, three or even more different social networking services. Thus, that user can access content shared by others via any of those social networking services.

SUMMARY

A system includes a processor programmed to initiate executable operations. The executable operations include accessing, by a first application executing on a client device, content. The executable operations also can include presenting, by the first application, the content to a user. The executable operations also can include, responsive to the first application presenting the content to the user, an operating system of the client device storing into a database metadata identifying at least the content. The executable operations also can include accessing the content by a second application executing on the client device. The executable operations also can include, responsive to the second application accessing the content, the operating system determining that the first application already presented the content by accessing the metadata in the database. The executable operations also can include, responsive to the operating system determining that the first application already presented the content, the operating system indicating to the second application not to present the content.

A computer program includes a computer readable storage medium having program code stored thereon. The program code is executable by a processor to perform a method. The method includes accessing, by a first application executing on a client device, content. The method also can include presenting, by the first application, the content to a user. The method also can include, responsive to the first application presenting the content to the user, an operating system of the client device storing into a database metadata identifying at least the content. The method also can include accessing the content by a second application executing on the client device. The method also can include, responsive to the second application accessing the content, the operating system determining that the first application already presented the content by accessing the metadata in the database. The method also can include, responsive to the operating system determining that the first application already presented the content, the operating system indicating to the second application not to present the content.

DETAILED DESCRIPTION

This disclosure relates to processing systems, and more specifically, to managing content accessed by the processing systems. In accordance with the inventive arrangements disclosed herein, a system, such as a client device, can be configured to avoid the redundant presentation of content to a user. In illustration, the system can, at the operating system level, track which content is presented to the user by various applications executing on the system. If content is shared with the user, and the system has already presented that content to the user, the system can, at the operating system level, implement processes to inhibit the content from again being presented by the system to the user. Because the processes are implemented at the operating system level, the various applications need not be configured to interface with one another to avoid redundant presentation of content. Instead, an operating system component, such as an application programming interface (API), can track the presentation of content and notify applications of content that already has been consumed.

Several definitions that apply throughout this document now will be presented.

As defined herein, the term "content" means information configured to be presented to one or more users. Content includes text, audio, one or more images, video, or any combination of text, audio, image(s) and/or video.

As defined herein, the term "operating system" means software that manages computer hardware and software resources and provides common services for computer programs. An operating system supports a processing system's basic functions, such as scheduling tasks, executing applications and controlling peripherals, and manages applications executing on the computer.

As defined herein, the term "application program interface" means a set of routines, protocols and tools that specify how software components should interact with an operating system. More particularly, an application program interface describes functions accomplished by a software module (e.g., a module of an operating system) and mechanisms used to pass information into and back from the module. Typically, this will include specification of the number and order of arguments used to interface with the module and, for each argument, the type of variable, an indication of whether information is copied into the argument or whether the argument contains an address in memory where the information is stored, and an indication of whether the argument passes information into the module, out of the module or both. An application program interface is commonly referred to by the acronym "API" and is well known to those of ordinary skill in the art.

As defined herein, the term "client device" means a processing system including at least one processor and memory that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "social networking system" means a system that provides social networking services, for instance via one or more websites. A social networking service is an online service platform on which social networks or social relations are built among people who, for example, share interests, activities, backgrounds or real-life connections, and via which people can share information with one another. As the term "social networking system" is defined herein, a messaging system per se (e.g., an e-mail system, a text messaging system, or an instant messaging system) is not a social networking system, though a social networking system can include an e-mail messaging system, a text messaging system and/or an instant messaging system in addition to one or more social networking components.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 1:
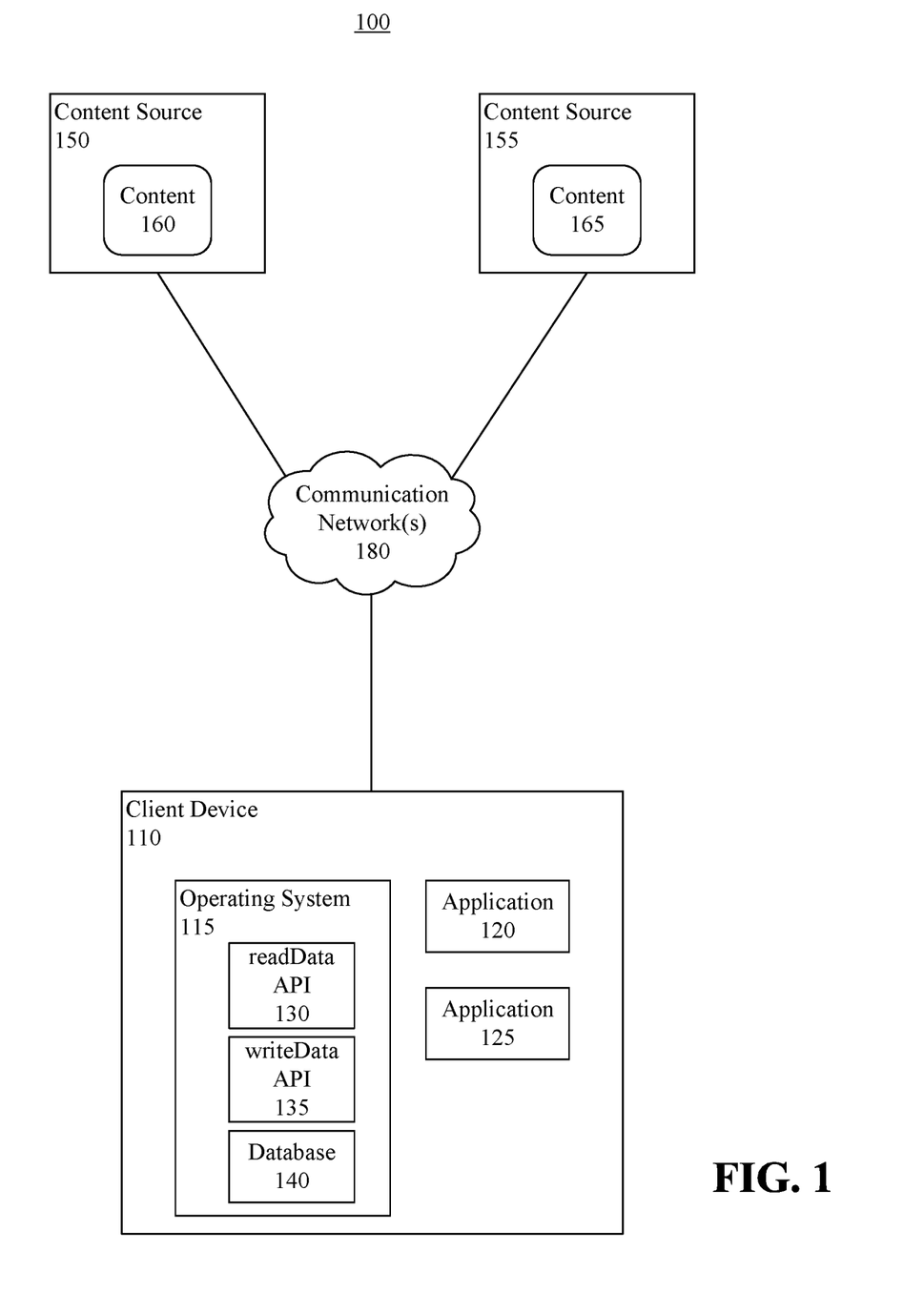
FIG. 1 is a block diagram illustrating an example of a computing environment.

FIG. 1 is a block diagram illustrating an example of a computing environment (hereinafter "environment") 100. The environment 100 can include a client device 110 including an operating system 115. The client device 110 can include a processor that executes the operating system 115. When executed, the operating system 115 can provide a computing environment in which a plurality of applications 120, 125 are hosted on the client device 110. The operating system 115 can include a plurality of application program interfaces (APIs), for example a readData API 130 and a writeData API 135, via which the applications 120, 125 may interface with the operating system 115. Further, the client device 110 can include a database 140.

The client device 110 can be communicatively linked to one or more content sources 150, 155 via at least one communication network 180. The communication network 180 is the medium used to provide communications links between various devices and data processing systems connected together the environment 100. The communication network 180 may include connections, such as wire, wireless communication links, or fiber optic cables. The communication network 180 can be implemented as, or include, any of a variety of different communication technologies such as a WAN, a LAN, a wireless network, a mobile network, a Virtual Private Network (VPN), the Internet, the Public Switched Telephone Network (PSTN), or similar technologies.

Each content source 150, 155 can host content 160, 165 that the applications 120, 125 may access via the communication network(s) 180. For example, the content source 150 can be a first social networking system hosted by one or more servers, and the content source 155 can be a second social networking system hosted by one or more servers. Users of the first social networking system can post the content 160 for sharing with other users, such as a user of the client device 110, and users of the second social networking system can post the content 165 for sharing with other users.

In one aspect of the present arrangements, for instance an arrangement in which the client device 110 is a mobile device, the applications 120, 125 can be mobile applications. For example, the application 120 can be a mobile application specifically configured to communicatively link to the content source 150, access the content 160, and present the content 160 to the user of the client device 110, for example using a display and/or audio transducers of the client device 110. Similarly, the application 125 can be a mobile application specifically configured to communicatively link to the content source 155, access the content 165, and present the content 165 to the user of the client device 110. The present arrangements are not limited in this regard, however. For example, the applications 120, 125 can be web applications or websites accessed by the client device 110 using one or more web browsers.

The applications 120, 125 can call the readData API 130 in response to accessing content 160, 165. The applications 120, 125 can call the writeData API 135 in response to presenting content 160, 165. When calling the APIs 130, 135, the applications 120, 125 can provide to the APIs 130, 135 input parameters specified by the APIs 130, 135 and receive from the APIs 130, 135 return values.

The readData API 130 can specify various input parameters required to call the readData API 130, for example "AppID," "Databuffer" and, optionally, "UserID." The AppID input parameter can be a unique identifier assigned to the application 120, 125 calling the readData API 130. For example, the operating system 115 can assign to each application 120, 125 a respective AppID. The Databuffer input parameter can be metadata associated with content 160, 165 being accessed, for example metadata assigned to the content 160, 165. The metadata can include, for instance, a checksum of the content, keywords, metatags, meta description, author name(s), a version identifier for the content 160, 165 (e.g., a version tag), a date indicating when the content 160, 165 was posted or generated (e.g., a date/time stamp), a uniform resource locator (URL) providing access to the content 160, 165, and so on. The application 120, 125 calling the readData API 130 can access at least a portion of the metadata from the content 160, 165.

By way of example, the keywords can be tags included in HTML of the content 160, 165, but not rendered by the application 120, 125 when presenting the content. In another example, the application 120, 125 can identify keywords that are rendered, for example keywords contained in a title or description of the content 160, 165 and/or keywords (e.g., nouns or verbs) frequently used in the content 160, 165), etc., and provide identified keywords in the Databuffer input parameter.

The checksum can be a value previously assigned to the content 160, 165, for example as metadata, or a value generated by the application 120, 125 in response to accessing or presenting the content 160, 165. In illustration, the application 120, 125 can generate a checksum value using a known technique, such as an MD5 algorithm, which is a widely used hash function producing a 128-bit hash value. Another example of an algorithm that may be used to generate a checksum value is a xxHash algorithm, which is an extremely fast has algorithm that runs at RAM speeds. Thus, a xxHash algorithm can be used to quickly generate a hash value for video content. Still, other algorithms can be used to generate checksum values and the present arrangements are not limited in this regard.

The UserID input parameter can be a unique identifier (e.g., username, etc.) assigned to a user using the client device 110 to access the content 160, 165. The readData API 130 also can specify a return value. The return value can indicate whether the content 160, 165 has already been presented on the client device 110 (or to the user). For example, a return value of "0" can indicate that the user has already consumed the content 160, 165 being accessed, and a return value of "1" can indicate that the user has not yet consumed the content 160, 165 being accessed.

Responsive to receiving from the readData API 130 a return value indicating that a particular content 160, 165 has not already been presented on the client device (or to the user), the application 120, 125 accessing that content 160, 165 can, in real time, present that particular content 160, 165. Responsive to receiving from the readData API 130 a return value indicating that a particular content 160, 165 has already been presented on the client device 110 (or to the user), however, the application 120, 125 accessing that content 160, 165 need not present that particular content 160, 165, thus avoiding redundant presentation of the content.

The writeData API 135 can specify various input parameters required to call the writeData API 135, for example "AppID," "Databuffer" and, optionally, "UserID," which were previously described. The writeData API 135 also can specify a return value. The return value can indicate whether an entry indicating the content 160, 165 being accessed has been successfully entered into the database 140. For example, a return value of "0" can indicate that the entry was not successfully entered into the database 140, and a return value of "1" can indicate that the entry was successfully entered into the database 140. Optionally, the writeData API 135 can specify an additional input parameter that indicates a number of times the operating system 115 should attempt to enter the entry into the database 140. In another arrangement, the operating system 115 can perform a default number of attempts.

Responsive to presenting respective content 160, 165 on the client device 110, the application 120, 125 can, in real time, automatically call with the writeData API 135 to identify the content 160, 165 in the database 140 (e.g., in the consumed content list). Thus, next time the readData API 130 is called for that particular content 160, 165, the readData API 130 can provide a return value indicating the content has already been presented. In one arrangement, in addition to, or in lieu of, identifying the content 160, 165 in the database 140, the content 160, 165 can be identified on one or more external databases, for example cloud based databases.

The following example is useful for understanding the present arrangements. Assume a user of the client device 110 accesses a first social networking system using the application 120. Also assume that the application 120 accesses the content 160 from the first social networking system. The content 160 can be, for example, an image, video or hyperlink shared by another user.

Responsive to the application 120 accessing the content 160, the application 120 can, in real time, automatically call the readData API 130 and provide as input parameters the AppID parameter assigned to the application 120, a Databuffer parameter associated with the content 160 and the UserID assigned to the user. The readData API 130 can query the database 140 to determine whether the Databuffer parameter is already stored in a record in the database 140, or whether the Databuffer parameter and the UserID are already stored together in a record of the database 140, for example in respective fields of the record. A plurality of records, which each include at least a respective Databuffer parameter, can be referred to as a "consumed content list."

Responsive to determining that the Databuffer parameter is already stored in the database 140, or the Databuffer parameter and UserID are already stored together in the database, the readData API 130 can, in real time, automatically communicate to the application 120 a return parameter indicating that the content 160 has been presented on the client device 110, or indicating that the content 160 has been presented to the user by the client device 110. In response to receiving such return parameter from the readData API 130, the application 120 need not present the content 160 to the user. For example, the application 120 can exclude the content 160 from a view presented to the user.

On the other hand, responsive to determining that the Databuffer parameter is not already stored in the database 140, the readData API 130 can, in real time, automatically communicate to the application 120 a return parameter indicating that the content 160 has not been presented on the client device 110, or indicating that the content 160 has not been presented to the user by the client device 110. In response to receiving such return parameter from the readData API 130, the application 120 can present the content 160 to the user of the client device 110 in a manner conventional for the application 120, and the application 120 can call the writeData API 135. In another arrangement, in response to generating such return parameter, the readData API 130 can, in real time, automatically call the writeData API 135. When calling the writeData API 135, the application 120 (or readData API 130) can provide as input parameters to the writeData API 135 the AppID parameter assigned to the application 120, the Databuffer parameter and the UserID assigned to the user. The writeData API 135 can store such parameters in a record in the database 140. In response to successfully storing the parameters, the writeData API 135 can communicate to the application 120 a return parameter indicating that the parameters have been written to the database 140.

At some time later, the user of the client device 110 may access a second social networking system using the application 125, and the application 125 may access the content 165 from the second social networking system. In this example, assume the content 165 and the content 160 are the same content. Thus, a Databuffer parameter associated with the content 165 (e.g., metadata identifying the content 165) will be the same as the Databuffer parameter associated with the content 160. The application 125 can, in real time, automatically call the readData API 130 in response to accessing the content 165 and provide as input parameters the AppID parameter assigned to the application 125, the Databuffer parameter associated with the content 160 and the UserID assigned to the user. Because the content 160, which is the same as the content 165, has already been presented, the readData API 130 can communicate to the application 125 a return parameter indicating that the content 165 has been presented on the client device 110, or indicating that the content 165 has been presented to the user by the client device 110. In response to receiving such return parameter from the readData API 130, the application 125 need not present the content 165 to the user. For example, the application 125 can exclude the content 165 from a view presented to the user. Accordingly, if the user views certain content in a first social networking system, and that same content is shared with the user in a second social networking system, the operating system 115 can implement processes to avoid presenting to the user the redundant content 165.

In other examples, the above processes can be applied to avoid presenting redundant content across a plurality of websites. For instance, assume the application 120 is a web browser and the content sources 150, 155 are different websites (e.g., news websites). If the user views particular content 160 on a first website, the present arrangements can be applied to prevent that same content from being presented to the user on a second website.

In one aspect of the present arrangements, the operating system 115, application 120 and/or application 125 can present to the user, via a user interface, a menu of user selectable settings. Such user selectable settings can include global level setting and per content setting. If the user has selected the global level setting, the processes described above can be applied to all content accessed by the client device 110, regardless of which application is accessing the content. If, however, the user has selected the per content setting and a particular content, the operating system 115, application 120 and/or application 125 can call the writeData API 135 to write the corresponding AppID, Databuffer and UserID parameters to a new record in the database 140 (e.g., in the consumed content list). Accordingly, the applications 120, 125 can avoid again presenting that content to the user in accordance with the above described processes.

The operating system 115 can perform maintenance on the database 140 to delete stale or old data from the consumed content list. Accordingly, a condition where content never again is presented after first being presented can be avoided. In illustration, each time the writeData API 135 adds a record to the database 140, the writeData API 135 can add a time/date stamp indicating when the record is added. The operating system 115 can implement an aging policy process to automatically delete records having time/data stamps that are older than a threshold value (e.g., older than three months). The threshold value can be a default value or a user specified value. Moreover, different threshold values can be assigned to different parameters. For example, the operating system 115 can assign a particular threshold value for records having a particular type of Databuffer (e.g., type of metadata), and a different threshold value for records having another type of Databuffer. In another arrangement, the operating system 115 can assign a particular threshold value for records having a particular AppID and another threshold value for records having a different AppID. In a case in which multiple users use the same client device 110, the operating system 115 can assign a particular threshold value for records having a particular UserID and another threshold value for records having a different UserID. In this regard, each user can specify the threshold value assigned by the operating system 115 for maintaining their data in the database 140.

Figure 2:
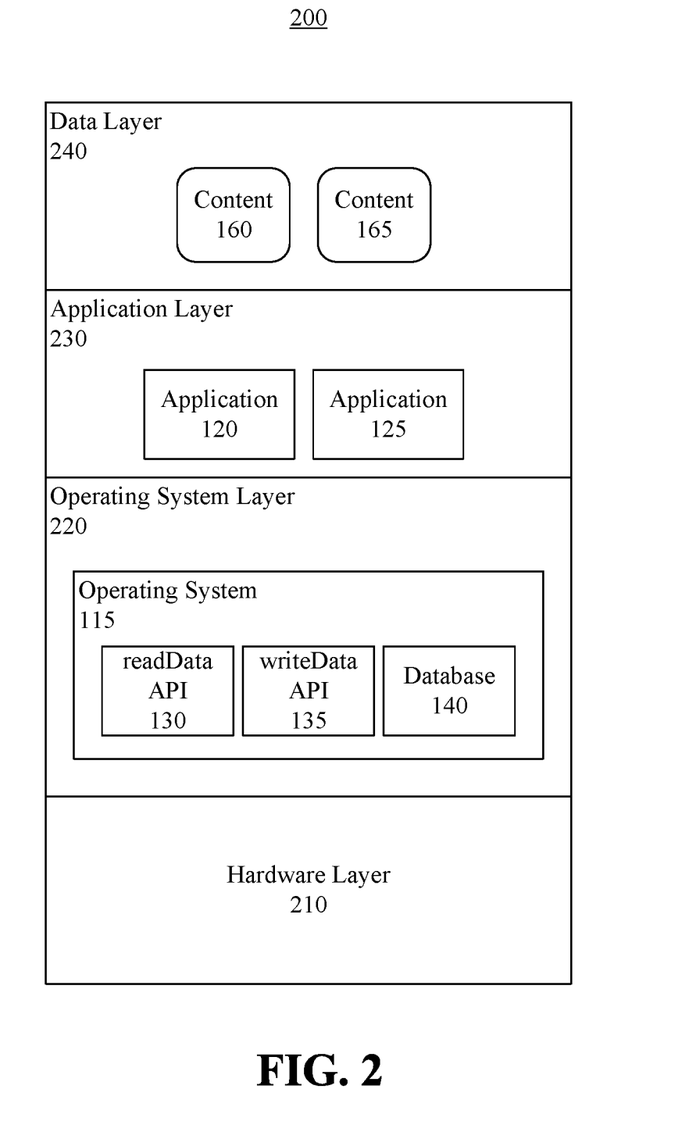
FIG. 2 is a diagram illustrating various system layers of a client device.

FIG. 2 is a diagram illustrating various system layers 200 of a client device 110. The system layers 200 can include a hardware layer 210, an operating system layer 220, an application layer 230 and a data layer 240. The hardware layer 210 includes the hardware of the client device 110, for example one or more processors, memory devices, displays, etc. The operating system layer 220 includes the operating system 115, which comprises the readData API 130, the writeData API 135 and, optionally, the database 140. The operating system 115 can interface directly with hardware components contained in the hardware layer 210. The application layer 230 can include the applications 120, 125, as well as any other applications installed on the client device 110, that execute in a computing environment hosted by the operating system 115. In this regard, rather than directly interfacing with the hardware components, the applications 120, 125 interface with the operating system 115, which can act as an intermediary between the applications 120, 125 and the hardware resources. The data layer 240 can include the content 160, 165, as well as any data other data used by the applications 120, 125.

Figure 3:
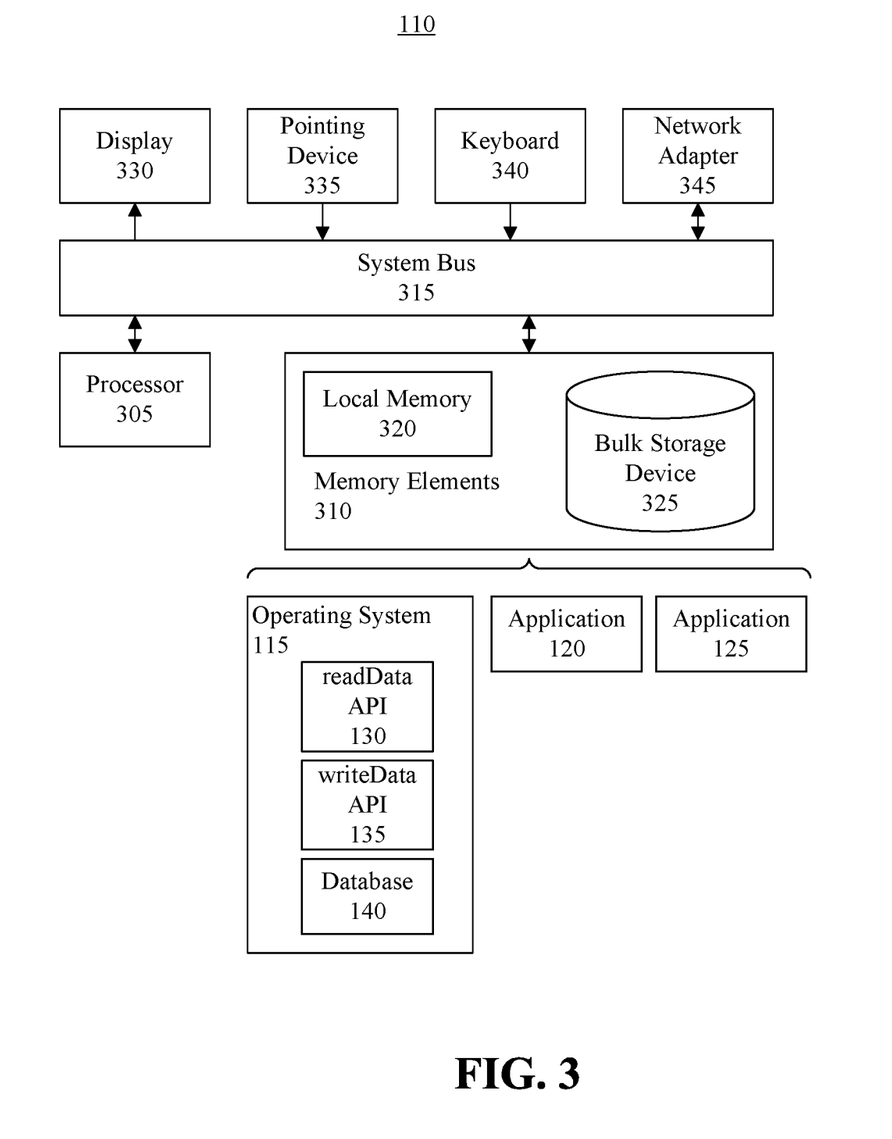
FIG. 3 is a block diagram illustrating example architecture for a client device.

FIG. 3 is a block diagram illustrating example architecture for the client device 110 in accordance with an arrangement disclosed within this specification. The client device 110 can include at least one processor 305 (e.g., a central processing unit) coupled to memory elements 310 through a system bus 315 or other suitable circuitry. As such, the client device 110 can store program code within the memory elements 310. The processor 305 can execute the program code accessed from the memory elements 310 via the system bus 315. It should be appreciated that the client device 110 can be implemented in the form of any system including a processor and memory that is capable of performing the functions and/or operations described within this specification.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The client device 110 also can include one or more cache memories (not shown) that provide temporary storage of at least some program code in order to reduce the number of times program code must be retrieved from the bulk storage device 325 during execution.

Input/output (I/O) devices such as a display 330 and, optionally, a pointing device 335, a keyboard 340 and/or audio transducers (not shown) can be coupled to the client device 110. The I/O devices can be coupled to the client device 110 either directly or through intervening I/O controllers. For example, the display 330 can be coupled to the client device 110 via a graphics processing unit (GPU), which may be a component of the processor 305 or a discrete device. One or more network adapters 345 also can be coupled to client device 110 to enable the client device 110 to become coupled to other systems, computer systems, remote printers, and/or remote storage devices through intervening private or public networks. Modems, cable modems, transceivers, and Ethernet cards are examples of different types of network adapters 345 that can be used with the client device 110.

As pictured in FIG. 3, the memory elements 310 can store the components of the client device 110, namely the operating system 115, including the readData API 130, the writeData API 135 and, optionally, the database 140, the application 120 and the application 125. Being implemented in the form of executable program code, these components of the client device 110 can be executed by the client device 110 and, as such, can be considered part of the client device 110. Moreover, the operating system 115, including the readData API 130, the writeData API 135 and, optionally, the database 140, and applications 120, 125 are functional data structures that impart functionality when employed as part of the client device 110. Moreover, the content 160, 165 are functional data structures that impart functionality when processed by the client device 110.

Figure 4:
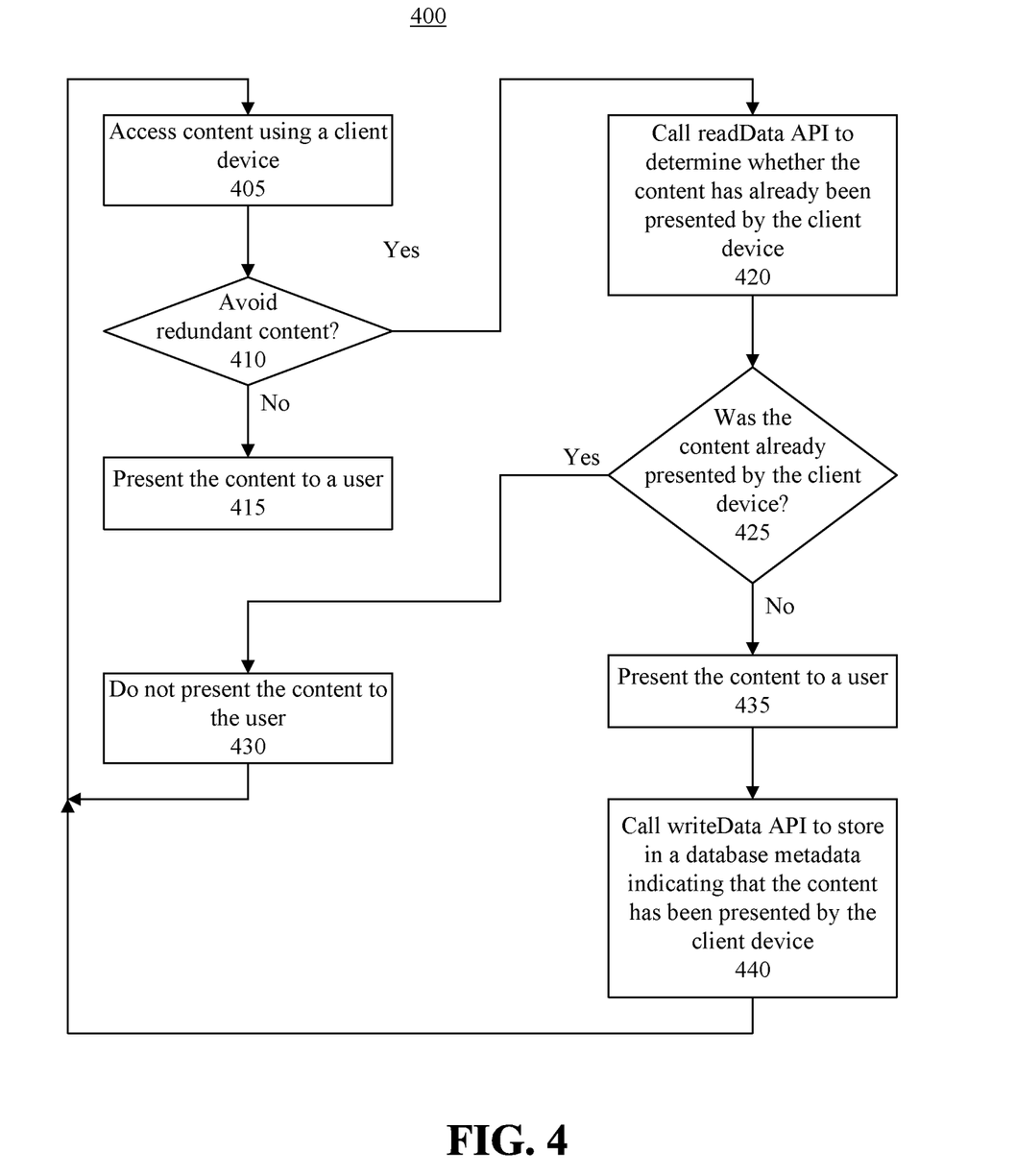
FIG. 4 is a flow chart illustrating an example of a method of avoiding redundant presentation of content.

FIG. 4 is a flow chart illustrating an example of a method 400 of avoiding redundant presentation of content. At step 405, an application executing on the client device can access content from a content source. As noted, the application can execute in a computing environment hosted by an operating system of the client device. At decision box 410, the application can determine whether presentation of redundant content should be avoided. For example, the application can access one or more user settings that indicate such. For example, the application can determine whether the user has selected the previously described global level setting or per content setting. If the user settings do not indicate that presentation of redundant content should be avoided, at step 415 the application can present the content to the user of the client device.

If the user settings do indicate that presentation of redundant content should be avoided, at step 420 the application can call a readData API. As noted, the readData API can determine whether the content has already been presented by the client device, for example to the user. Also as noted, the application can provide input parameters to the readData API and the readData API can access a database to determine whether the content has already been presented by the client device to the user. Based on such determination, the readData API can provide a return parameter to the application. The return parameter can indicate whether the content has already been presented by the client device to the user, or indicate to the application whether or not to present the content to the user.

Referring to decision box 425, if the return parameter indicates that the content has already been presented by the client device to the user (or indicates not to present the content to the user), at step 430 the application need not present the content to the user. If, however, the return parameter indicates that the content has not already been presented by the client device to the user (or indicates to present the content to the user), at step 435 the application can present the content to the user. Further, at step 440 the application can call a writeData API. The writeData API can store in the database metadata indicating that the content has been presented by the client device, or metadata indicating that the content has been presented to the user by the client device. The process can return to step 405 and continue while the application, or other applications executing on the client device, continue to access content from one or more content sources.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system, comprising:
a processor programmed to initiate executable operations comprising:
accessing, by a first application executing on a client device, a content;

presenting, by the first application, the content to a user;
responsive to the first application presenting the content to the user, storing, by an operating system of the client device, into a database metadata identifying at least the content;
accessing, by a second application executing on the client device, the content;
responsive to the second application accessing the content, the operating system determining that the first application already presented the content by accessing the metadata in the database; and
responsive to the operating system determining that the first application already presented the content, the operating system indicating to the second application not to present the content.

2. The system of claim 1, wherein both the first application and the second application are executed in a computing environment hosted by the operating system.

3. The system of claim 1, wherein storing, by the operating system of the client device, into the database the metadata identifying at least the content comprises an application program interface of the operating system storing the metadata into the database.

4. The system of claim 3, wherein the application program interface is called by the first application.

5. The system of claim 1, wherein the operating system determining that the first application already presented the content by accessing the metadata in the database comprises an application program interface of the operating system determining that the first application already presented the content to the user by accessing the metadata in the database.

6. The system of claim 5, wherein the application program interface is called by the second application.

7. The system of claim 1, the executable operations further comprising:
responsive to the first application presenting the content to the user, storing, by the operating system of the client device, into the database a user identifier identifying the user;
wherein the operating system determining that the first application already presented the content comprises the operating system determining that the first application already presented the content to the user based in the user identifier stored into the database.

8. The system of claim 1, wherein the operating system indicating to the second application not to present the content further is responsive to determining that the user has selected a user selectable setting indicating not to present content that has already been presented to the user.

9. A computer program product comprising a computer readable storage medium having program code stored thereon, the program code executable by a processor to perform a method comprising:
accessing, by a first application executing on a client device, a content;
presenting, by the first application, the content to a user;
responsive to the first application presenting the content to the user, storing, by an operating system of the client device, into a database metadata identifying at least the content;
accessing, by a second application executing on the client device, the content;
responsive to the second application accessing the content, the operating system determining that the first application already presented the content by accessing the metadata in the database; and
responsive to the operating system determining that the first application already presented the content, the operating system indicating to the second application not to present the content.

10. The computer program product of claim 9, wherein both the first application and the second application are executed in a computing environment hosted by the operating system.

11. The computer program product of claim 9, wherein storing, by the operating system of the client device, into the database the metadata identifying at least the content comprises an application program interface of the operating system storing the metadata into the database.

12. The computer program product of claim 11, wherein the application program interface is called by the first application.

13. The computer program product of claim 9, wherein the operating system determining that the first application already presented the content by accessing the metadata in the database comprises an application program interface of the operating system determining that the first application already presented the content to the user by accessing the metadata in the database.

14. The computer program product of claim 13, wherein the application program interface is called by the second application.

15. The computer program product of claim 9, the method further comprising:
responsive to the first application presenting the content to the user, storing, by the operating system of the client device, into the database a user identifier identifying the user;
wherein the operating system determining that the first application already presented the content comprises the operating system determining that the first application already presented the content to the user based in the user identifier stored into the database.

16. The computer program product of claim 9, wherein the operating system indicating to the second application not to present the content further is responsive to determining that the user has selected a user selectable setting indicating not to present content that has already been presented to the user.

* * * * *